United States Patent [19]
Iwade et al.

[11] Patent Number: 6,151,026
[45] Date of Patent: Nov. 21, 2000

[54] IMAGE PROCESSING APPARATUS AND IMAGE PROCESSING METHOD

[75] Inventors: Takashi Iwade; Ryuta Ueda, both of Tokyo, Japan

[73] Assignee: Sega Enterprises, Ltd., Tokyo, Japan

[21] Appl. No.: 09/359,681

[22] Filed: Jul. 23, 1999

[30]  Foreign Application Priority Data

Mar. 2, 1999 [JP] Japan ................................. 11-053726

[51] Int. Cl.$^7$ .................................................. G06T 17/00
[52] U.S. Cl. ........................... 345/420; 345/434; 345/441
[58] Field of Search .................................. 345/419, 421, 345/420, 426, 433, 434, 435, 441

[56]  References Cited

U.S. PATENT DOCUMENTS

| | | |
|---|---|---|
| 4,709,231 | 11/1987 | Sakaibara et al. . |
| 4,847,789 | 7/1989 | Kelly et al. . |
| 4,901,064 | 2/1990 | Deering . |
| 5,043,922 | 8/1991 | Matsumoto . |
| 5,325,470 | 6/1994 | Sumino et al. ........................... 345/421 |
| 5,659,671 | 8/1997 | Tannenbaum et al. .................. 345/426 |
| 5,835,095 | 11/1998 | Smith et al. ............................. 345/421 |
| 5,880,736 | 3/1999 | Peercy et al. ............................. 345/426 |
| 5,898,437 | 4/1999 | Deolaliker ................................. 345/421 |

*Primary Examiner*—Mark Zimmerman
*Assistant Examiner*—Kimbinh T. Nguyen
*Attorney, Agent, or Firm*—Dickstein Shapiro Morin & Oshinsky LLP

[57]  ABSTRACT

An image processing apparatus and an image processing method are proposed for the high speed generation of a model, such as a plane picture in animation, for which an outline is drawn. In the image processing apparatus, for using computer graphics to generate a polygon model in three-dimensional coordinate space, a first model, for which the normal vectors of polygons are directed outward, and a second model, in which the first model is included and for which the normal vectors of polygons are directed inward, are synthesized as a single model. The direction of the normal vector of a polygon is employed in the hidden surface removal process to determine whether the polygon should be displayed. That is, when the normal vector of a polygon includes an element extended in the direction of the viewpoint, the pertinent polygon is displayed; but when the normal vector of a polygon does not include an element extended in the direction opposite to that of the viewpoint, the pertinent polygon is not displayed. As a result, the second model is expressed as an outline of the first model.

19 Claims, 15 Drawing Sheets

FIG. 4

| Polygon Number | Coordinate | Normal Vector | Color | Transparency |
|---|---|---|---|---|
| P1 | $V_{11}(X_{11}, Y_{11}, Z_{11})$ | n11 | C11 | S11 |
| | $V_{12}(X_{12}, Y_{12}, Z_{12})$ | n12 | C12 | S12 |
| | $V_{13}(X_{13}, Y_{13}, Z_{13})$ | n13 | C13 | S13 |
| | $V_{14}(X_{14}, Y_{14}, Z_{14})$ | n14 | C14 | S14 |
| P2 | $V_{21}(X_{21}, Y_{21}, Z_{21})$ | n21 | C21 | S21 |
| | $V_{22}(X_{22}, Y_{22}, Z_{22})$ | n22 | C22 | S22 |
| | $V_{23}(X_{23}, Y_{23}, Z_{23})$ | n23 | C23 | S23 |
| | $V_{24}(X_{24}, Y_{24}, Z_{24})$ | n24 | C24 | S24 |
| ⋮ | ⋮ | ⋮ | ⋮ | ⋮ |
| Pn | $V_{n1}(X_{n1}, Y_{n1}, Z_{n1})$ | $n_{n1}$ | $C_{n1}$ | $S_{n1}$ |
| | $V_{n2}(X_{n2}, Y_{n2}, Z_{n2})$ | $n_{n2}$ | $C_{n2}$ | $S_{n2}$ |
| | $V_{n3}(X_{n3}, Y_{n3}, Z_{n3})$ | $n_{n3}$ | $C_{n3}$ | $S_{n3}$ |
| | $V_{n4}(X_{n4}, Y_{n4}, Z_{n4})$ | $n_{n4}$ | $C_{n4}$ | $S_{n4}$ |

FIG. 6

| Polygon Number | Coordinate | Normal Vector | Color | Transparency |
|---|---|---|---|---|
| P1 | $V_{11}(\alpha X_{11}, \alpha Y_{11}, \alpha Z_{11})$ | n11 | C11 | S11 |
|    | $V_{12}(\alpha X_{12}, \alpha Y_{12}, \alpha Z_{12})$ | n12 | C12 | S12 |
|    | $V_{13}(\alpha X_{13}, \alpha Y_{13}, \alpha Z_{13})$ | n13 | C13 | S13 |
|    | $V_{14}(\alpha X_{14}, \alpha Y_{14}, \alpha Z_{14})$ | n14 | C14 | S14 |
| P2 | $V_{21}(\alpha X_{21}, \alpha Y_{21}, \alpha Z_{21})$ | n21 | C21 | S21 |
|    | $V_{22}(\alpha X_{22}, \alpha Y_{22}, \alpha Z_{22})$ | n22 | C22 | S22 |
|    | $V_{23}(\alpha X_{23}, \alpha Y_{23}, \alpha Z_{23})$ | n23 | C23 | S23 |
|    | $V_{24}(\alpha X_{24}, \alpha Y_{24}, \alpha Z_{24})$ | n24 | C24 | S24 |
| ⋮ | ⋮ | ⋮ | ⋮ | ⋮ |
| Pn | $V_{n1}(\alpha X_{n1}, \alpha Y_{n1}, \alpha Z_{n1})$ | $n_{n1}$ | $C_{n1}$ | $S_{n1}$ |
|    | $V_{n2}(\alpha X_{n2}, \alpha Y_{n2}, \alpha Z_{n2})$ | $n_{n2}$ | $C_{n2}$ | $S_{n2}$ |
|    | $V_{n3}(\alpha X_{n3}, \alpha Y_{n3}, \alpha Z_{n3})$ | $n_{n3}$ | $C_{n3}$ | $S_{n3}$ |
|    | $V_{n4}(\alpha X_{n4}, \alpha Y_{n4}, \alpha Z_{n4})$ | $n_{n4}$ | $C_{n4}$ | $S_{n4}$ |

IMAGE PROCESSING APPARATUS AND IMAGE PROCESSING METHOD

BACKGROUND OF THE INVENTION

1. Field of the Invention

The present invention relates to an image processing apparatus and to an image processing method for computer graphics.

2. Related Arts

In image processing using computer graphics, normally, a polygon model is generated in three-dimensional coordinate space, and hidden surface removal and shading processes are performed for the polygon model. The obtained model is converted into a model with two-dimensional coordinates, which is then superimposed on a background screen. In this case, in order to highlight the model on the background screen, a special calculation is performed for the model data to simplify the gray scaling of the model or to add an outline to the model.

For example, for software used for preparing a 3D-CG image, a polygon model in three-dimensional coordinate space is projected onto a two-dimensional screen, the boundary between the projected model and the background screen is calculated, and a line having a designated width is drawn along the boundary to generate the outline.

As is described above, in conventional three-dimensional computer graphics, the process of generating the outline for a model is performed by extracting portions of three-dimensional polygon models for which an outline should be generated, and by drawing a line having a designated width at the extracted portions. Thus, the load is increased which is placed on the calculations performed to identify the portions of the polygon models where the outline is to be generated, and an extended time is required for the process of generating the outline.

However, in a game machine, for example, which employs computer graphics, models must be changed in real time in accordance with instructions entered by a player. And since according to the conventional outline generation method an outline is generated by calculating the boundary between changing models, an extended time is needed for the required calculations. Thus, in a game machine for which it is important that a model respond immediately to manipulation by a player, the process of generating an outline for a model can not be performed in real time.

In addition, since according to the conventional method the outline is generated by drawing a line having a designated width along the boundary between a model and a background screen, regardless of the distance between the model and a camera, a perspective view of the model can not be obtained by changing the line width of the outline.

SUMMARY OF THE INVENTION

It is, therefore, one objective of the present invention to provide an image processing apparatus and an image processing method for the high speed generation of a model, such as a plane picture in animation, for which an outline is drawn.

It is another objective of the present invention to provide an image processing apparatus and an image processing method for the high speed changing of the line width of the outline of a model.

To achieve the above objectives, provided is an image processing apparatus, for using computer graphics to generate a polygon model in three-dimensional coordinate space wherein a first model, for which the normal vectors of polygons are directed outward, and a second model, in which the first model is included and for which the normal vectors of polygons are directed inward, are synthesized as a single model, and an image processing method therefor.

According to the present invention, the direction of the normal vector of a polygon is employed in the hidden surface removal process to determine whether the polygon should be displayed. That is, when the normal vector of a polygon includes an element extended in the direction of the viewpoint, the pertinent polygon is displayed; but when the normal vector of a polygon does not include an element extended in the direction opposite to that of the viewpoint, the pertinent polygon is not displayed. As a result, the second model is expressed as an outline of the first model.

Furthermore, according to the present invention, since an outline is generated by processing a three-dimensional polygon, and the calculations for detecting the boundary between the model projected on in a two-dimensional screen and a background screen are not required, the outline can be generated at an extremely high speed.

In addition, since an outline is added to a three-dimensional polygon, the portion of an outline which is near a camera is expressed as a thick line and the portion of an outline which is distant from a camera is expressed as a thin line, without any special calculations being required. As a result, a perspective view of the model can be obtained without the processing speed being deteriorated.

BRIEF DESCRIPTION OF THE DRAWINGS

FIG. 4 is a diagram showing data for model A according to the embodiment of the present invention;

FIG. 6 is a diagram showing data for model B according to the embodiment of the present invention;

DETAILED DESCRIPTION OF THE PREFERRED EMBODIMENT

Figure 1:
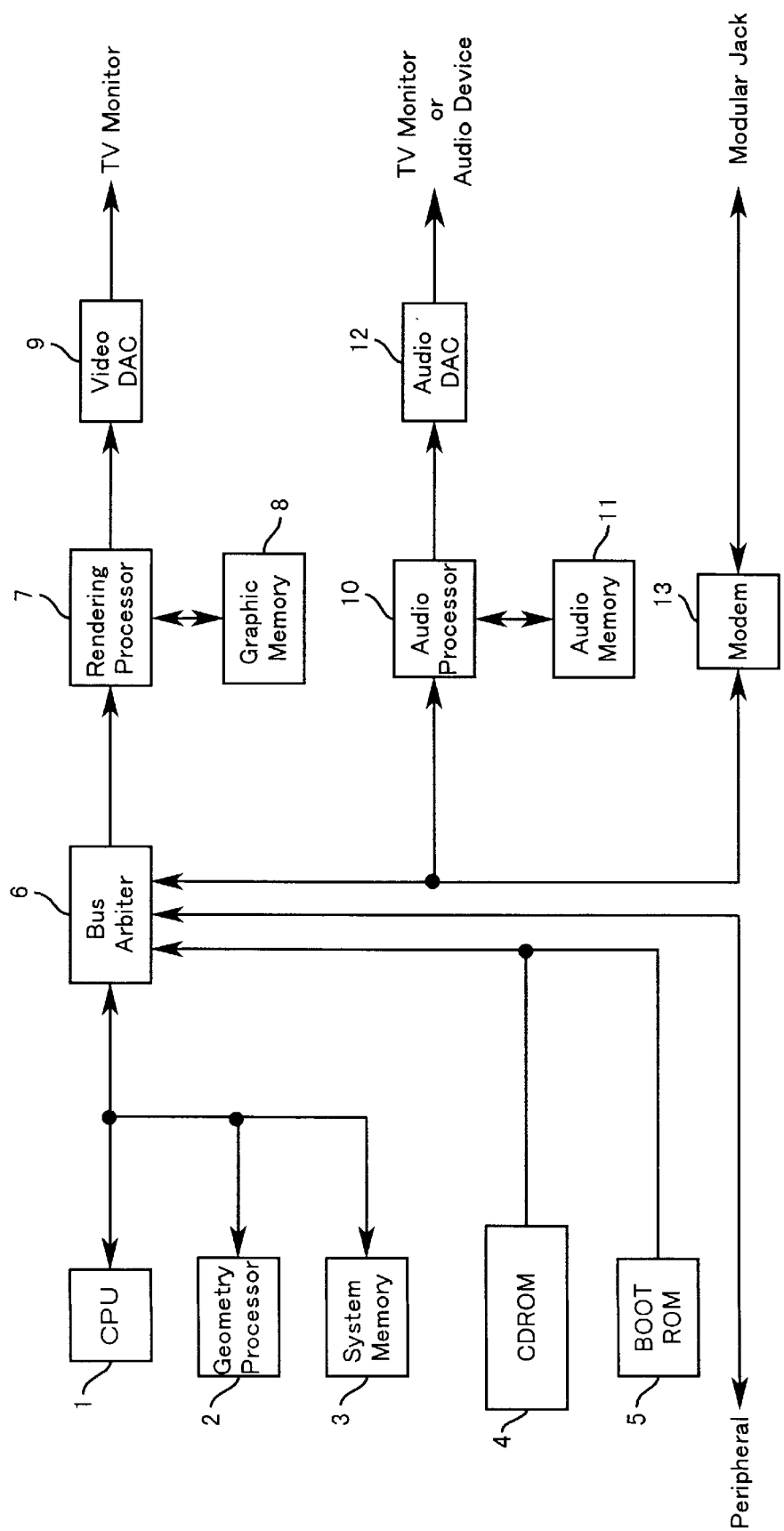
FIG. 1 is a block diagram illustrating an image processing apparatus according to one embodiment of the present invention.

The preferred embodiment of the present invention will now be described while referring to the accompanying drawings. FIG. 1 is a block diagram illustrating an image processing apparatus according to the embodiment of the present invention. For fast image processing, the image processing apparatus in this embodiment includes a plurality of processors for the high speed, simultaneous performance of a geometry process and a rendering process.

A CPU 1 reads an activation program from a boot ROM 5 and a system program from a system memory 3, and initializes the image processing apparatus. The CPU 1 also reads, from a CD-ROM 4, an application program which it executes while exercising control of the image processing apparatus.

A geometry processor 2 is a processor for performing the high speed processing of three-dimensional coordinate data for a polygon. The geometry processor 2 receives polygon coordinate data from the CPU 1, processes them in accordance with the movement or the rotation of a model, calculates the normal vector of the polygon, and performs clipping and the changing of the field of view.

As will be described later, in the image processing apparatus in this embodiment, an outline process for a three-dimensional polygon model is performed before a rendering processor 7 performs the rendering of the model. As a result, the outline can be generated at an extremely high speed.

The rendering processor 7 is a processor for performing the high speed rendering of a model, and for performing a hidden surface removal process and a shading process for polygon data received from the geometry processor 2. In the image processing apparatus in this embodiment, the high speed setting of the luminance of the outline is effected by the designation of a luminance parameter by the rendering processor 7.

The data for each individual screen for the model processed by the rendering processor 7 is stored in a graphic memory 8, and is converted into a video signal by a video D/A converter 9. Thereafter, the video signal is displayed on a television monitor (not shown).

An audio processor 10 reads music data from the CD-ROM 4, and also reads from an audio memory 11 data for sound effects which correspond to the manipulation of controls by a user. These audio data are converted into analog signals by an audio D/A converter 12, and the analog signals are output to a television monitor or to an audio device (not shown).

A bus arbiter 6 determines which processor is to be granted the right of use of a bus. That is, since in the image processing apparatus in this embodiment a plurality of processors, including the CPU 1 and the rendering processor 7, share a single bus, the bus arbiter 6 manages and arbitrates the right of use of the bus so that data transmitted by the CPU 1 do not conflict with data transmitted by the rendering processor 7.

A modem 13 is a modulator/demodulator for exchanging data along a telephone line, and is connected to a modular jack (not shown). It should be noted that peripheral devices connected to the bus arbiter 6 in FIG. 1 include those which are detachable from image processing apparatus or the controller, such as a switch for the key operation of a controller (not shown), a backup memory, a display device and a pointing device.

The image processing according to the embodiment will now be described while referring to the flowchart in FIG. 2 and the example displays and example data shown in FIGS. 3 to 14. As shown in the example diagrams in FIGS. 3 to 14, a model is generated by employing dividing procedures, and, to provide a display to be used for explaining the individual procedures, is projected onto a two-dimensional screen. However, three-dimensional coordinate data are employed for the actual individual procedures, and the process of projecting the model onto the two-dimensional screen is performed by the geometry processor 2 after all the procedures have been completed.

Figure 2:
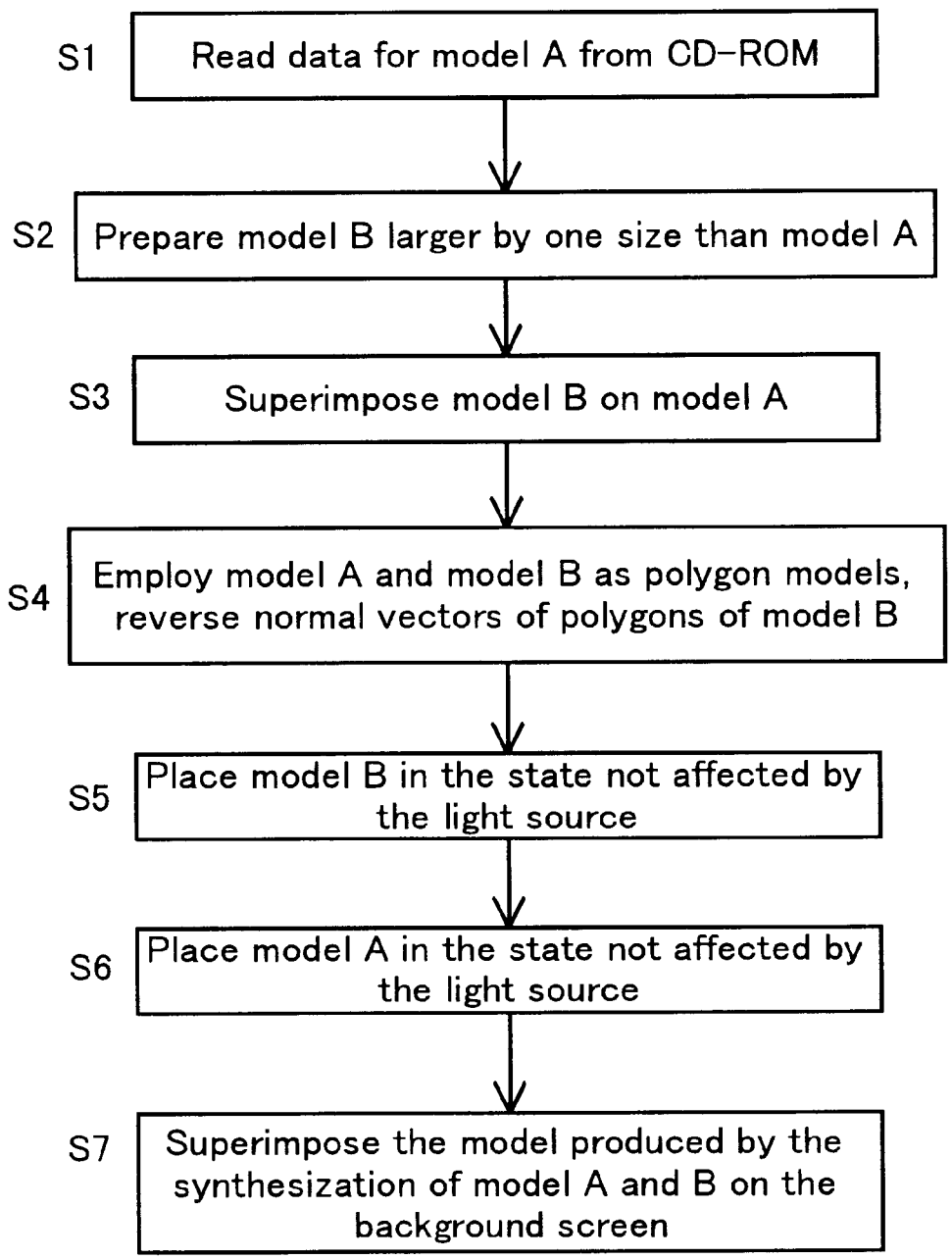
FIG. 2 is a flowchart showing the image processing performed for the embodiment of the present invention.
Figure 3:
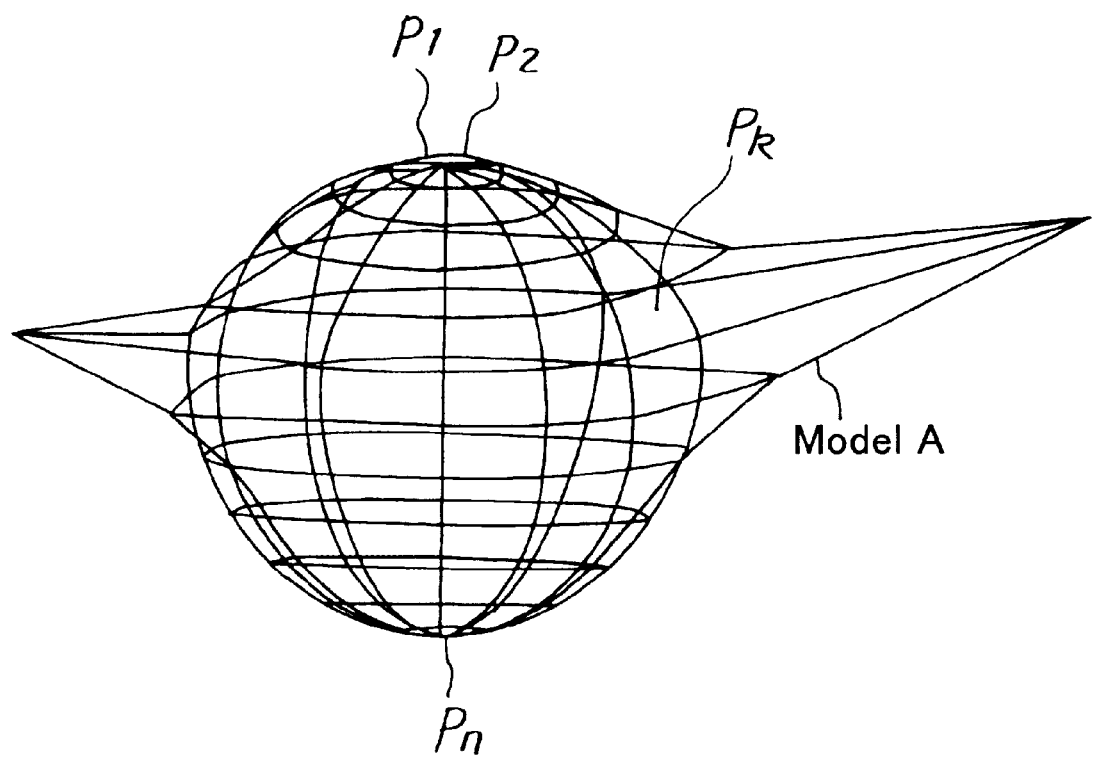
FIG. 3 is a diagram showing the wire frame for model A according to the embodiment of the present invention.

As is shown in the flowchart in FIG. 2, the image processing in the embodiment is begun when the CPU 1 reads from the CD-ROM 4 data for model A (a model of a character for a game, etc.) (S1), and transmits the data to the geometry processor 2. Assume that, as is shown in FIG. 3, model A is a spherical object with horns extending to the sides and is constituted by polygons P1 to Pn. Also assume that the data for model A which is from the CD-ROM 4 are coordinates for the vertexes of the individual polygons, normal vectors, colors, and transparencies. The coordinates of the vertexes are local coordinate values for which the center of gravity of model A is the origin.

Figure 5:
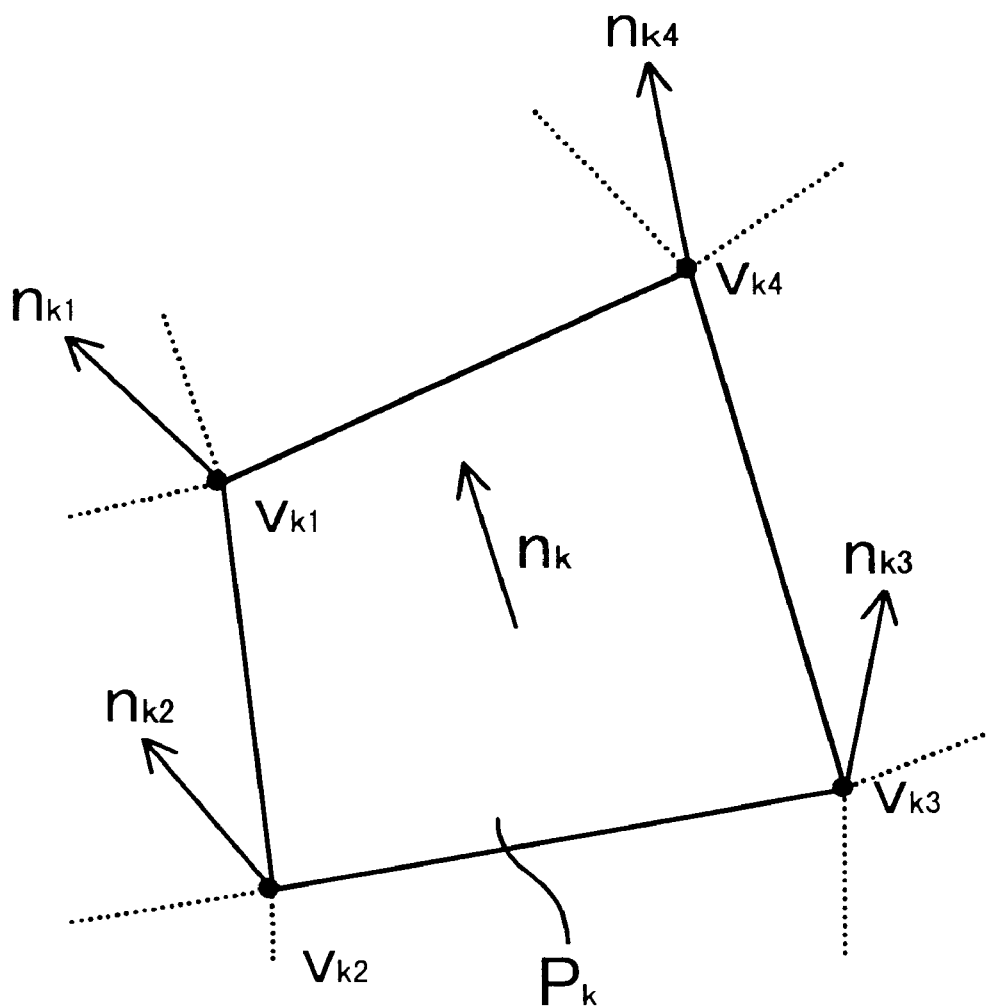
FIG. 5 is a diagram used for explaining polygon Pk of model A according to the embodiment of the present invention.

FIG. 5 is a diagram showing a polygon Pk of model A. Polygon Pk is formed with vertexes Vk1 to Vk4, and normal vectors nk1 to nk4 whose initial points are the vertexes Vk1 to Vk4. Since the model A is supposed to be viewed from a point outside model A, the normal vectors of the vertexes are directed towards points outside model A. Normal vector nk of polygon Pk is calculated by, for example, averaging the normal vectors nk1 to nk4 for the vertexes.

Then, the geometry processor 2 prepares three-dimensional model B, which is larger by one size than model A (S2). FIG. 6 is a diagram showing the data for model B which were obtained by magnifying model A at a constant ratio . . . Since the coordinates of the vertexes of the polygons of model A are local coordinate values for which the center of gravity of model A is the origin, the coordinates of the vertexes for model B are . times the vertex coordinates for model A. It should be noted that, as will be described later, a magnification ratio for one part of model A may be changed instead of magnifying all of model A at ratio . . . For example, if the magnification ratio for the horns of model A is increased, the horns can be emphasized.

Following this, model B is superimposed on model A (S3). That is, the geometry processor 2 matches the center of gravity of model B with that of model A in the world coordinate system, without changing the directions of models A and B. The state wherein model B has been superimposed on model A is shown in FIG. 7.

In this case, the superimposition of model B on model A actually means that the data for model B are linked to the data for model A by the geometry processor 2. That is, since the data for model B are coupled together with the data for model A with a predetermined relationship, model B interacts with model A when, for example, model A moves in the world coordinate space.

Figure 7:
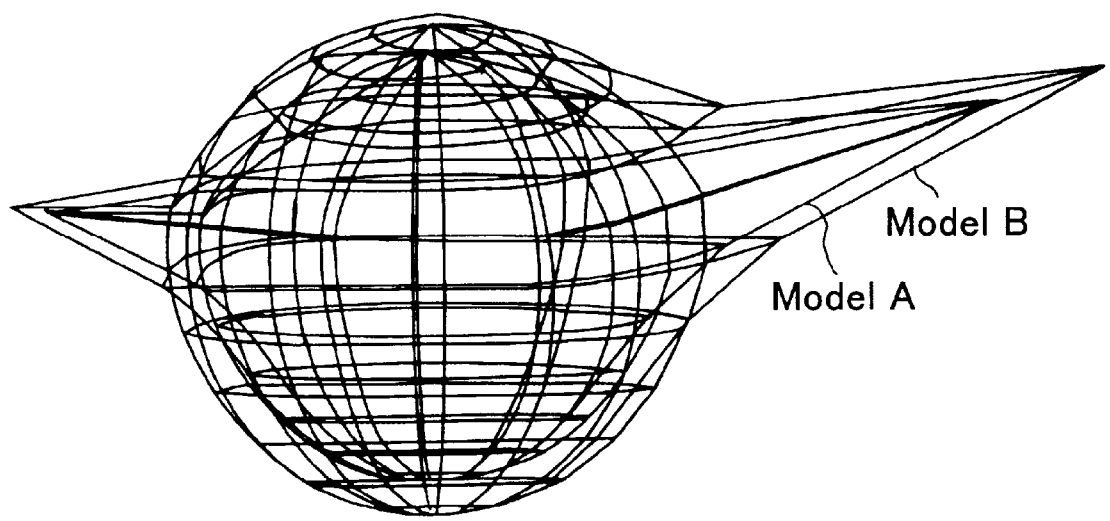
FIG. 7 is a diagram showing a wire frame wherein model B is superimposed on model A in the embodiment of the present invention.

In the example in FIG. 7, the center of gravity of model B is matched with that of model A. However, the center of gravity of model B need only have a predetermined relationship with that of model A. When, the center of gravity of model B is positioned slightly higher than that of model A, the outline of the upper portion of model A is thickened, so that the upper portion of model A can be highlighted.

Next, while employing model A and model B as polygon models (S4), the geometry processor 2 reverses the directions of the normal vectors of the polygons of model B. The direction of the normal vector of a polygon is used in the hidden surface removal process by the rendering processor to determine whether the relevant polygon should be displayed. Specifically, the rendering processor 7 displays a polygon when the normal vector of the relevant polygon includes an element extended in the viewpoint direction, and does not display the polygon when the normal vector includes an element extended in a direction opposite to that of the viewpoint. Therefore, model B is used as the outline for model A.

Figure 8A:
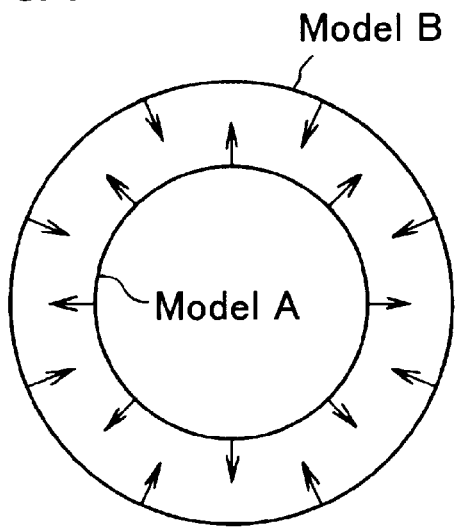
FIGS. 8A and 8B are diagrams (I) for explaining the generation of an outline according to the embodiment of the present invention.

This process will now be described, while referring to FIGS. 8 and 9, by simplifying model A and model B. In FIG. 8A, spherical model A, in which the normal vectors of polygons are directed outward, is included within spherical model B, which is larger than model A by one size and in which the normal vectors of polygons are directed inward.

Figure 8B:
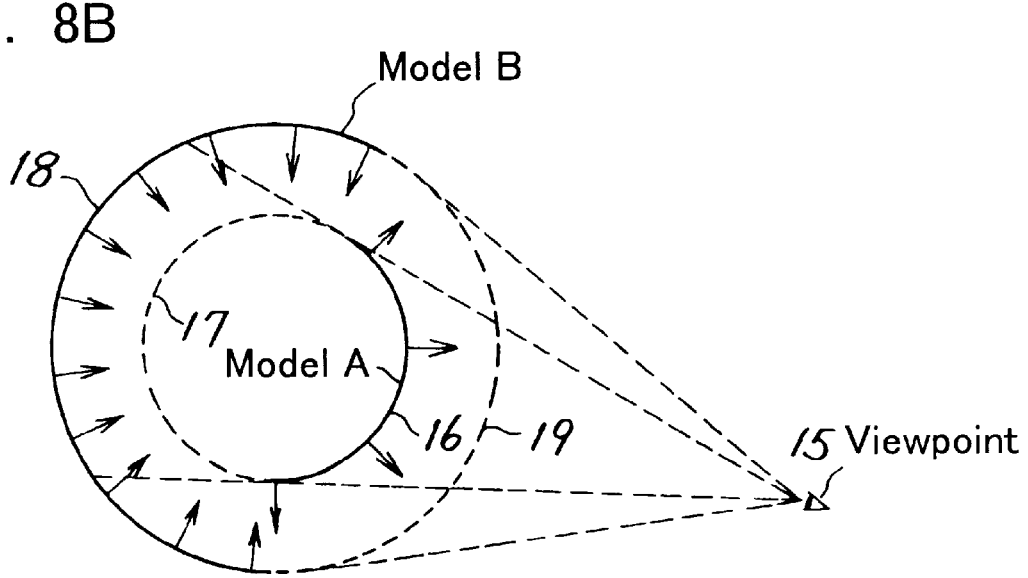

FIG. 8B is a diagram showing a polygon which is to be displayed when model A and model B are viewed from a viewpoint 15 outside model B. Since the normal vectors of model A are directed outward, each of the polygons for which the normal vectors include an element extended in the direction of the viewpoint, i.e., a semi-spherical portion 16 near the viewpoint 15, is to be displayed, and each of the polygons for which the normal vectors include an element extended in the direction opposite of that to the viewpoint, i.e., a semi-spherical portion 17 located at a distance from the viewpoint 15, is not to be displayed.

Since the normal vectors of model B are directed inward, each of the polygons for which the normal vectors include an element extended in the direction of the viewpoint, i.e., a semi-spherical portion 18 located at a distance from the viewpoint 15, is to be displayed, and each of the polygons for which the normal vectors include an element extended in a direction opposite of that to the viewpoint, i.e., a semi-spherical portion 19 near the viewpoint 15, is not to be displayed.

Figure 9A:
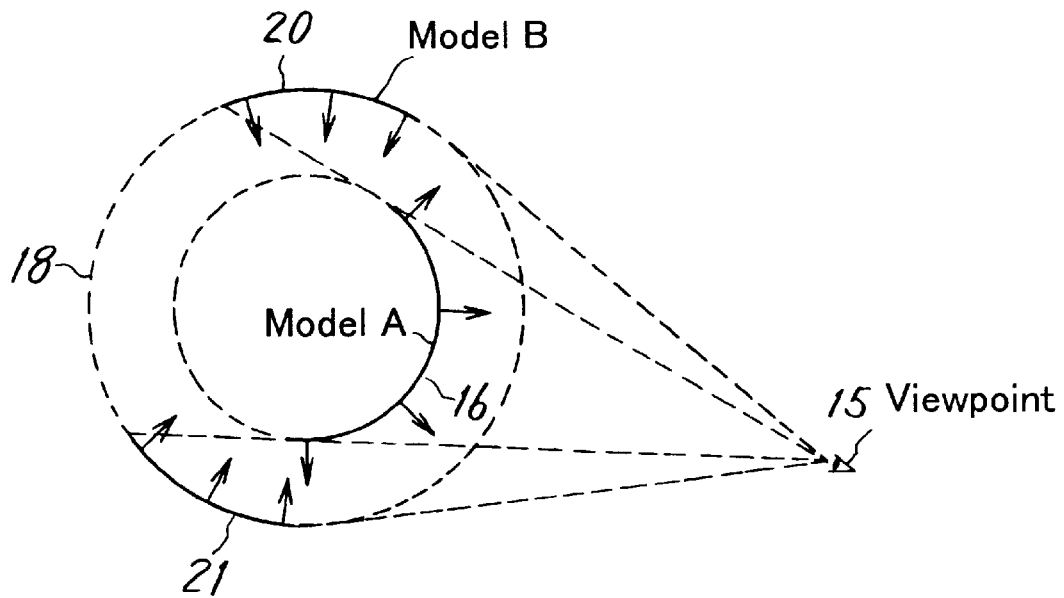
FIGS. 9A and 9B are diagrams (II) for explaining the generation of an outline according to the embodiment of the present invention.

FIG. 9A is a diagram showing polygons which are to be displayed when model A and model B are viewed from the viewpoint 15 outside model B. For model A, the semi-spherical portion 16, for which the normal vectors include an element extended in the direction of the viewpoint and which is near the viewpoint 15, is displayed. For model B, semi-spherical portions 20 and 21, which are obtained by removing from the semi-spherical portion 18, located at a distance from the viewpoint 15, a portion hidden by model A relative to the viewpoint 15, are displayed.

Figure 9B:
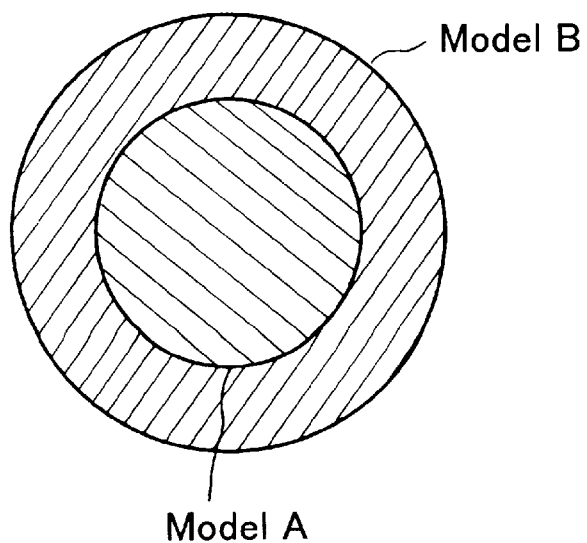

FIG. 9B is a diagram showing an example two-dimensional screen coordinate display when model A and model B are viewed from the viewpoint 15. As is shown in FIG. 9B, for model A, polygons near the viewpoint 15 are displayed in the same manner as for a normal display. For model B, only the portion outside model A is displayed, so that model B is displayed as the outline for model A.

Figure 10:
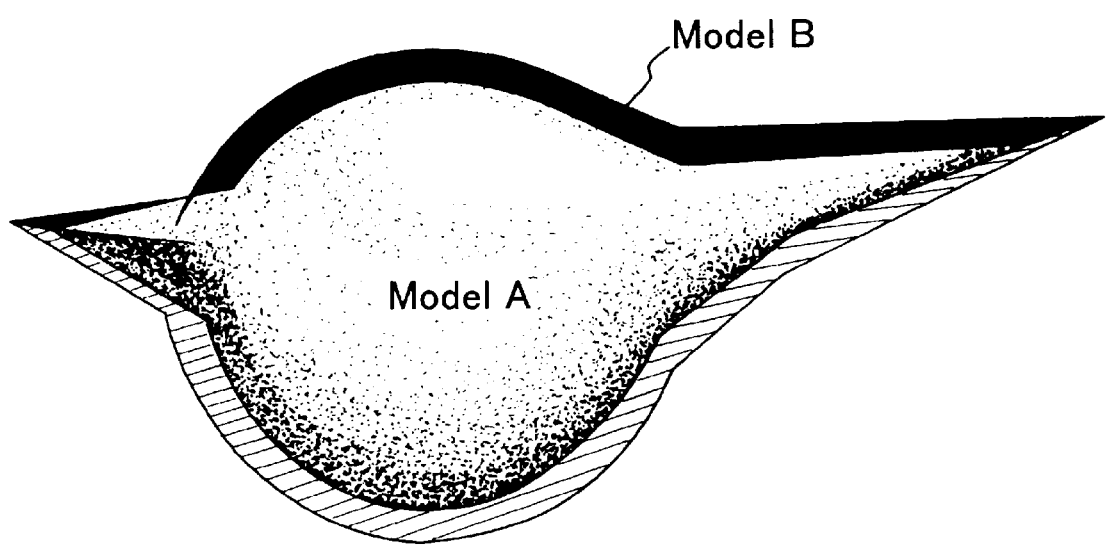
FIG. 10 is a diagram showing an example display wherein the normal direction for model B is inverted and models A and model B are positioned so that Lambart's law applies.

FIG. 10 is a diagram showing an example display when the above process is performed for model A and model B in FIG. 7. The rendering processor 7 performs a process to add shading, due to a light source, to a model processed by the removal of hidden surfaces. The display example in FIG. 10 shows the state where, as a result of the shading process, both model A and model B are affected by a light source (Lambert state).

As was previously described, since for model A the normal vectors of the polygons are directed outward, the polygons of model A on the viewpoint side are displayed in the same manner as for a normal display, and polygons on the side opposite to that nearest the viewpoint are regarded as hidden surfaces and are not displayed. For model B, since the normal vectors of polygons are directed inward, the manner in which the polygons of model B on the side opposite to that nearest the viewpoint are displayed is the reverse of the manner employed for the normal display, and polygons on the viewpoint side are regarded as hidden surfaces and are not displayed. Polygons of model B which are on the side opposite to that nearest the viewpoint, and which are hidden by model A are not displayed following the normal removal of hidden surfaces. As a result, model B is expressed so as to be near the outline of model A.

Since in FIG. 10 the shading is performed by assuming that on the screen the light source is located above, the luminance at the top face of model A which is directed toward the light source is high, and the luminance at the lower face, away from the light source is low. Since the normal vectors of polygons of model B are directed inward, model B is like a "bowl" covering model A, so that the luminance at the upper portion of model B is low, with no light from the light source, and the lower portion is illuminated slightly by receiving light from the light source.

Figure 11:
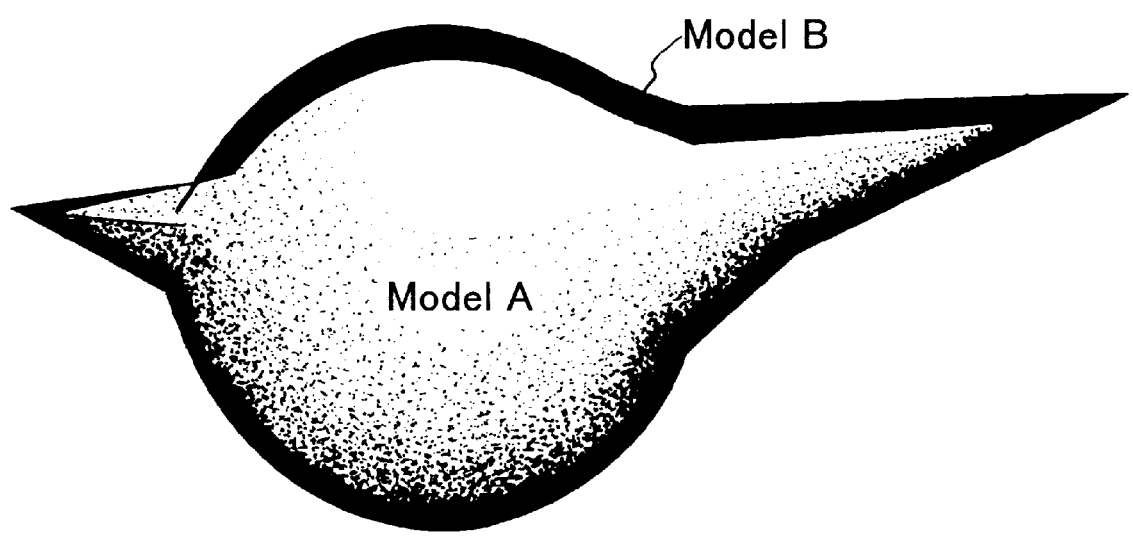
FIG. 11 is a diagram showing an example display where model B is set to a constant state.

Then, model B is placed in the state where it is not affected by the light source (constant) (S5). This display is shown in FIG. 11. As is shown in FIG. 11, since model B is unaffected by the light source, all the portions have the same luminance, regardless of the positions of the light source and the camera, and are displayed as an outline of model A. It should be noted that a constant luminance which is not affected by the light source is satisfactory for model B and that, while model B is displayed as a solid color, such as black or blue, depth can be displayed by slightly changing the color.

Figure 12:
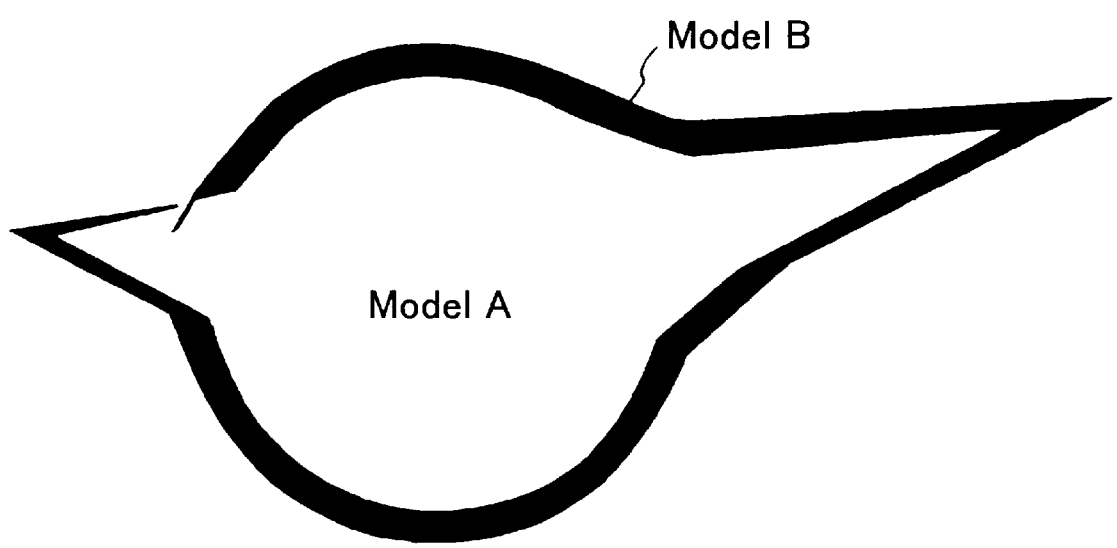
FIG. 12 is a diagram showing an example display where model A is also set to a constant state.

Sequentially, model A is placed in the state where it is not affected by the light source (constant) (S6). This display is shown in FIG. 12. Since model A is unaffected by the light source and appears as a solid color having a constant luminance, a model produced by the synthesization of model A and model B is used for a special presentation such as a sketch or for animation, which differs from other computer graphics models.

Figure 13A:
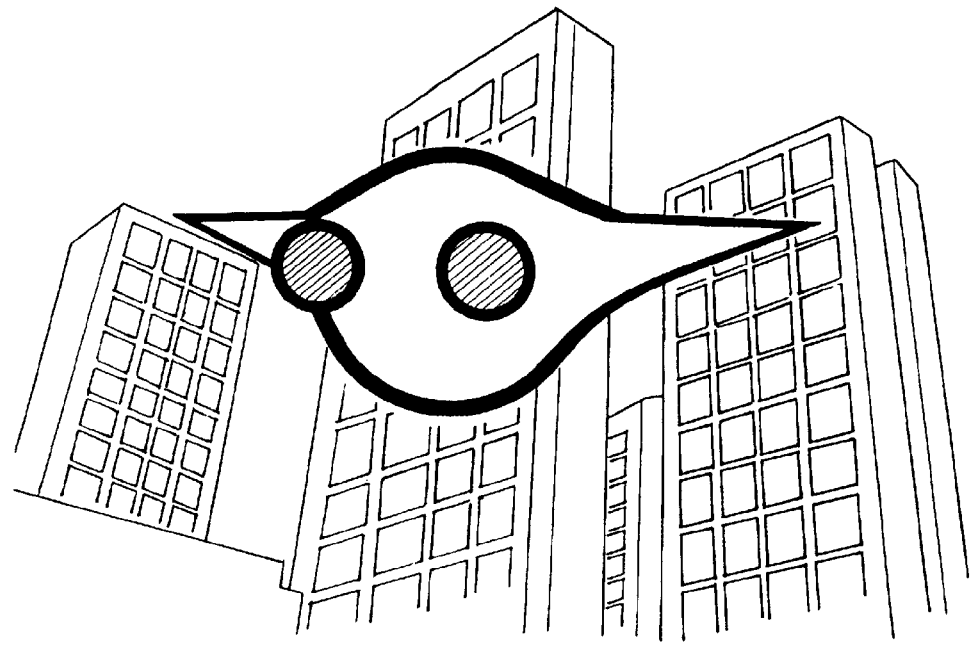
FIGS. 13A and 13B are diagrams showing example displays according to the embodiment of the present invention.
Figure 13B:
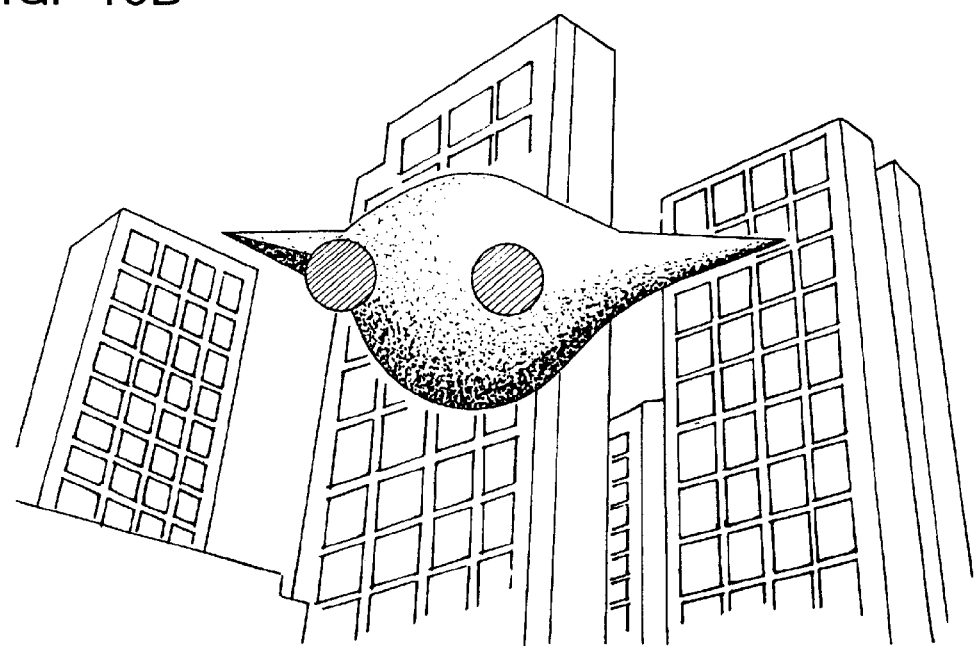

Next, the rendering processor 7 superimposes the model produced by the synthesization of models A and B on the background screen (S7). FIG. 13A is a diagram showing an example display where a model to which the outline has been added is superimposed on the background screen through the image processing performed in this embodiment; and FIG. 13B is a diagram showing as a comparison an example display where a model without an outline is superimposed on the background screen. As is shown in FIG. 13A, the outline functions to highlight the model and to separate it from the background, and especially in a game machine which uses computer graphics, when a two-dimensionally expressed character model is placed in a three-dimensional expressed background, the model can be vividly highlighted.

Figure 14:
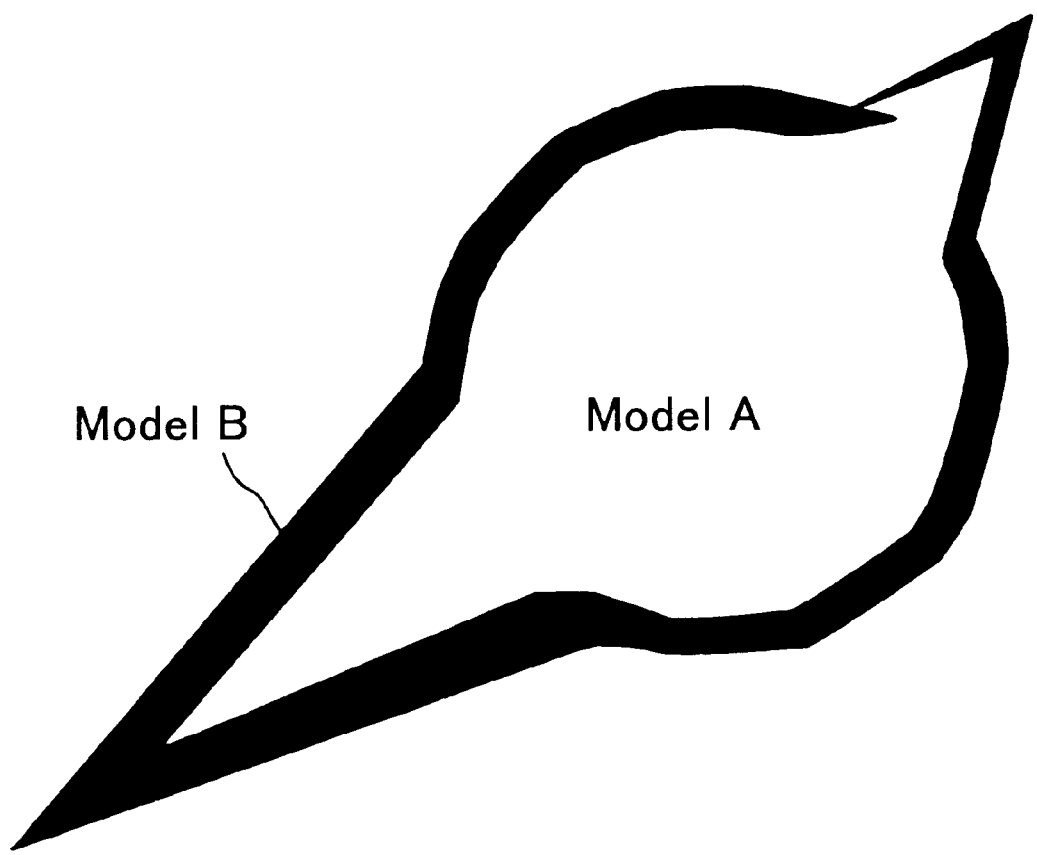
FIG. 14 is a diagram showing an example display for perspective according to the embodiment of the present invention.

Special effects for the image processing in this embodiment will now be described. FIG. 14 is a diagram showing an example display where the perspective for model A and model B is emphasized while neither model is affected by the light source. Specifically, since in three-dimensional coordinate space, in comparison with model A, model B is magnified at a constant ratio, the geometry processor 2 performs a normal transparency conversion, and as a result, the outline near the camera is thick and the outline at a distance from the camera is thin.

Therefore, since in the image processing of this embodiment the outline near the camera is thick and the outline at a distance from the camera is thin without special calculation being required, the perspective of the model can be emphasized without reducing the speed.

Figure 15:
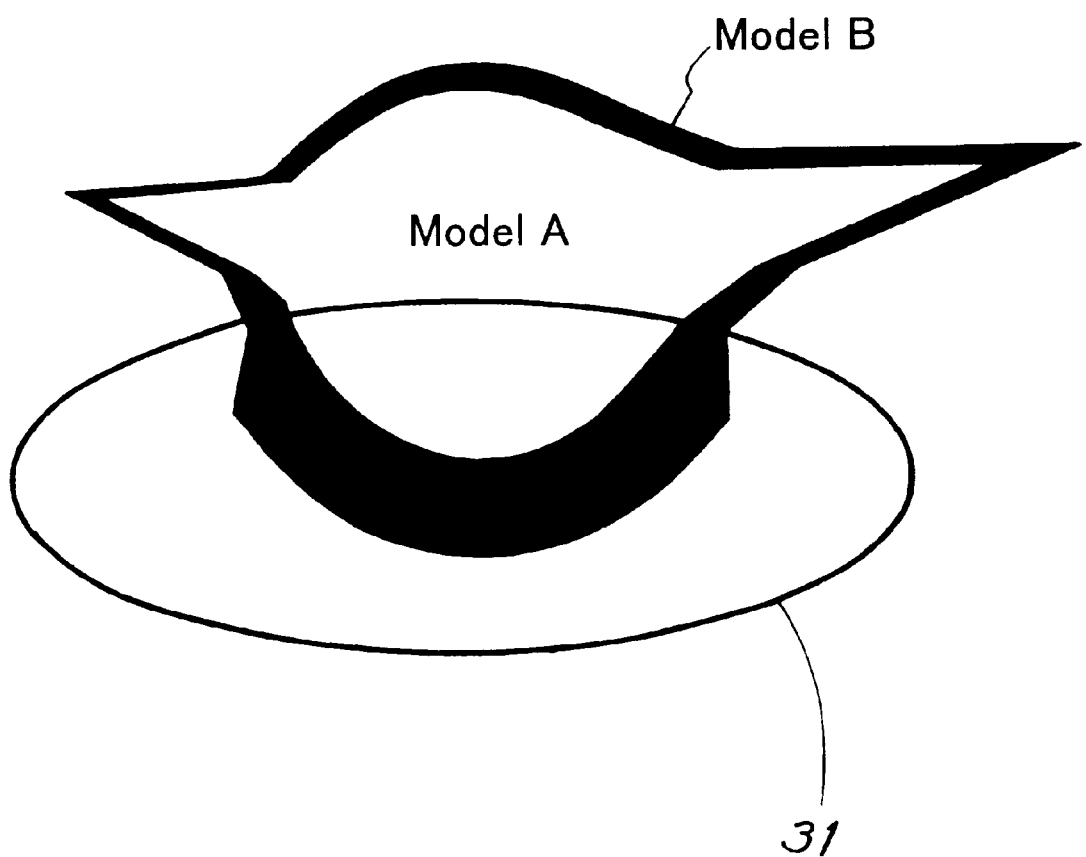
FIG. 15 is a diagram showing a modification of the outline according to the embodiment of the present invention.

FIG. 15 is a diagram showing an example where one part of model B is modified in the image processing in this embodiment. That is, in the process at step S2 in FIG. 2 for preparing model B, which is one size larger than model A, the magnification ratio for a portion enclosed by a circle 31 in FIG. 15 is greater than is that for the other portions. The outline of a desired portion of model A can be thickened by increasing the magnification ratio for one part of model A, and an emphasized view of model A can be prepared from the normal model.

As is described above, according to the present invention, an image processing apparatus and an image processing method can be provided for the rapid generation of a model, such as a plane picture in animated wherein an outline is drawn, and for rapidly changing the line width of the outline of the model.

What is claimed is:

1. An image processing apparatus, for using computer graphics to generate a polygon model in a three-dimensional coordinate space, comprising:

geometry means for employing data for a first model read from a storage medium to generate a second model by the magnification of said first model at a predetermined ratio, for reversing the directions of the normal vectors of polygons of said second model, and for enclosing said first model in said second model; and rendering means for performing rendering for said first and said second models processed by said geometry means.

2. An image processing apparatus according to claim 1, wherein said geometry means links the center of gravity or vertex data for said first model with that for said second model in accordance with a predetermined relationship.

3. An image processing apparatus according to claim 1, wherein said geometry means changes said ratio for magnification of said first model in accordance with the portion of said first model.

4. An image processing apparatus according to claim 1, wherein said geometry means links data for said second model with data for said first model.

5. An image processing apparatus according to claim 1, wherein said rendering means stabilizes the luminance of said second model.

6. An image processing apparatus according to claim 1, wherein said rendering means sets a single color for said second model.

7. An image processing apparatus according to claim 5 or 6, wherein said rendering means stabilizes the luminance of said first model.

8. An image processing apparatus for providing a displayed image on a display device, said image processing apparatus comprising:

a processing unit for producing an image on said display device, wherein said image is from a vantage point of a virtual camera, said image being a selected surface of a three-dimensional model located in a virtual three-dimensional space, wherein said three-dimensional model is formed by enclosing a first model in a second model obtained by magnifying said first model at a predetermined ratio; and wherein the surface of said first model facing said second model and the surface of said second model facing said first model are selected.

9. An image processing apparatus according to claim 8, wherein said first model and said second model are so located that the center of gravity or the vertex coordinate data for said first model is linked with that for said second model in accordance with a predetermined relationship.

10. An image processing apparatus for use with a display device, said image processing apparatus comprising:

a processing unit for producing an image on said display device, wherein said image is from a vantage point of a virtual camera positioned opposite a selected surface of a three-dimensional model located in virtual three-dimensional space, wherein said three-dimensional model includes a line along an external circumference, and the thickness of said line is changed in accordance with the distance from said virtual camera.

11. An image processing method, for using computer graphics to generate a polygon model in a three-dimensional coordinate space, comprising:

a geometry step of employing data for a first model read from a storage medium to generate a second model by the magnification of said first model at a predetermined ratio, of reversing the directions of the normal vectors of polygons of said second model, and of enclosing said first model in said second model; and a rendering step of performing rendering for said first and said second models processed at said geometry step.

12. An image processing method according to claim 11, wherein at said geometry step, the center of gravity or vertex data for said first model is linked with that for said second model in accordance with a predetermined relationship.

13. An image processing method according to claim 11, wherein at said geometry step, said ratio for magnification of said first model is changed in accordance with the portion of said first model.

14. An image processing method according to claim 11, wherein at said geometry step, data for said second model are linked with data for said first model.

15. An image processing method according to claim 11, wherein at said rendering step, the luminance of said second model is stabilized.

16. An image processing method according to claim 11, wherein at said rendering step, a single color is set for said second model.

17. An image processing method according to claim 15 or 16, wherein at said rendering step, the luminance of said first model is stabilized.

18. A storage medium storing an image processing program for using computer graphics to generate a polygon model in a three-dimensional coordinate space and data for a first model, said image processing program comprising:

a geometry process step of employing said data for said first model read from a storage medium to generate a second model by the magnification of said first model at a predetermined ratio, of reversing the directions of the normal vectors of polygons of said second model, and of enclosing said first model in said second model; and a rendering process step of performing rendering for said first and said second models processed at said geometry process step.

19. A storage medium storing a computer readable image processing program, said image processing program being configured to operate a computer to control a display on a display device of an image from a vantage point of a virtual camera, said image being a selected surface of a three-dimensional model in a virtual three-dimensional space, and data for the three-dimensional model, wherein the data for the three-dimensional model is formed by enclosing a first model in a second model obtained by magnifying the first model at a predetermined ratio; and wherein the surface of the first model facing the second model and the surface of the second model facing the first model are selected.

* * * * *